United States Patent [19]

Litwin

[11] 4,191,085

[45] Mar. 4, 1980

[54] FOLD-AWAY STRINGED MUSICAL INSTRUMENT

[76] Inventor: Bradley N. Litwin, R.D. 4, Box 101 B, W. Brattleboro, Vt. 05301

[21] Appl. No.: 945,311

[22] Filed: Sep. 25, 1978

[51] Int. Cl.$^2$ .......................... G10D 1/08; G01D 3/00

[52] U.S. Cl. .......................................... 84/293; 84/291

[58] Field of Search ................. 84/173, 267, 275, 290, 84/291, 293

[56] References Cited

U.S. PATENT DOCUMENTS

| | | | |
|---|---|---|---|
| 538,205 | 4/1895 | Back | 84/293 |
| 2,464,100 | 3/1949 | Ruggiero | 84/275 |
| 3,910,151 | 10/1975 | Copeland | 84/267 |
| 4,073,211 | 2/1978 | Jorgensen | 84/291 |

FOREIGN PATENT DOCUMENTS

| | | | |
|---|---|---|---|
| 2614714 | 10/1977 | Fed. Rep. of Germany | 84/293 |

*Primary Examiner*—Lawrence R. Franklin

*Attorney, Agent, or Firm*—Wolf, Greenfield & Sacks

[57] ABSTRACT

A fold-away stringed musical instrument whose neck is detachable from and stored within its sound box. The instrument is detachable into three main portions: sound box, neck and removable portion of the upper surface of the soundbox. The neck portion is joined to the sound box portion in a tennon-mortise arrangement having a locking pin between the lower end of the sound box and the tennon.

6 Claims, 5 Drawing Figures

FOLD-AWAY STRINGED MUSICAL INSTRUMENT

BACKGROUND OF THE INVENTION

The musical entertainment field has become an increasingly portable business which requires extensive travel on the part of musicians and their equipment. This is particularly so for the popular groups which employ several string instruments usually guitars. The larger groups and orchestras also experience several tours a year which require travel within and sometimes outside of the United States.

Presently, the expense in transporting musical instruments throughout the country is quite great. Guitars as well as other stringed instruments have traditionally been transported in rather large protective cases. These cases are often so bulky that they are very difficult to carry on planes and buses. The result is that most string instruments, such as guitars, basses, etc., are transported in the luggage bins of planes and buses. This is especially disconcerting to the owner-musician because of the often uncontrolled climate conditions in such compartments which can affect the wood and strings of the instrument. Further, the insensitive handling of a stringed instrument by airline or bus personnel usually results in severe damage to the instrument. These instruments are especially vulnerable because of the relatively narrow and fragile nature of the neck.

A search of the prior art in collapsible musical devices has uncovered the patents cited below. In Middlebrooke, U.S. Pat. No. 519,409, a foldable banjo is shown to have a hinged fingerboard portion to allow the fingerboard portion to hold onto the sound box. The Sawyer U.S. Pat. No. 1,747,650 teaches a neck portion hinged to the sounding box portion for purposes of providing variable tension on a stringed musical instrument. In Parker, U.S. Pat. No. 1,755,019, a guitar is shown to have a neck to which is permitted limited swinging motion so as to cause a vibrato tone. The collapsible bass fiddle in Ruggiero, U.S. Pat. No. 2,464,100 teaches a device whose sound box section is split into two sections and then telescopically stacked one within the other. The string portion of the instrument is then partially inserted into the stacked sound box sections as shown in FIG. 6. In Gassin et al., U.S. Pat. No. 2,803,982, a disassembled bass violin is shown in its appropriate carrying case. It is shown in Savona, U.S. Pat. No. 3,130,625 that the entire stringed portion of a musical instrument can be removed and be interchangeable with other such instruments suitably adapted. In Robinson, U.S. Pat. No. 3,657,462 is taught a detachable stringed instrument having its neck portion completely detachable from the sound box portion. The removable neck instrument taught in Dopera, U.S. Pat. No. 3,831,485 has a neck with a male type plug which fits within a female socket in the body of the instrument. Fastener means secure the male portion to the female portion. Finally, in Jorgenson, U.S. Pat. No. 4,073,211 is disclosed a collapsible guitar which has a hinged neck to sound box and is foldable into a shaped recess in the back of the body.

BRIEF DESCRIPTION OF THE INVENTION

The present invention refers to a fold-away stringed musical instrument, whose neck is detachable from and completely stored within its sound box. Basically, the instrument is detachable into three main portions, and, when reassembled into its folded configuration, presents a self-contained traveling unit which completely protects the neck portion of the instrument. The significant traveling advantages are achieved without altering the accoustical or tonal characteristics of the instrument.

The three main portions are a sound box portion, a neck portion, and a portion of the upper surface of the sound box. Since the preferred embodiment of the present invention is shown in the drawings and description below as a guitar, the removable portion of the upper surface of the sound box will for the sake of clarity be hereinafter referred to as a fingerboard end portion. For those stringed instruments such as violins which do not have a fingerboard end connected to the upper surface of the sound box, it can be appreciated that a removable portion of the upper surface of the sound box is being recited.

The sound box portion is typically the most cumbersome portion of a stringed instrument, in that it is a four-sided hollow enclosure with a sound hole along its upper surface. The finger board end portion is positioned between the neck portion and the sound hole of the sound box. The fingerboard end portion is the portion of the fingerboard closest to the sound hole. Typically, the strings are strummed or moved at a location above the sound hole. The neck portion is a rather long, elongated section of the instrument across which the strings are stretched and terminated at its distal end at the peg head portion. The strings of the instrument are caused to extend from the peg head portion along the neck portion and finger board end portion and secured at a bridge saddle located on the sound box at the side of the sound hole opposite the finger board end portion.

The neck portion is joined to the sound box portion in a tennon-mortise arrangement. After insertion of the tennon of the neck portion through the mortise of the sound box portion, a locking pin is inserted through the bottom of the sound box, through the tennon portion of the neck. The fingerboard end is then inserted into the top surface of the sound box, covering the tennon of the neck portion. To disassemble this instrument, tension is relieved from the strings, the fingerboard end portion is moved rearward, and the lock pin is removed from the tennon of the neck portion. Upon separation of the neck portion from the sound box portion, the neck portion can be inserted upside down and completely confined by the sound box portion of the instrument. After insertion of the neck within the sound box, the fingerboard end portion is inserted along the upper surface of the sound box, thus providing a protective enclosure for the neck portion of the instrument.

Thus, the present invention is one which affords a stringed musical instrument adequate protection during transit and because of its structural configuration does not alter the desired quality of tones emanating from the instrument. Further, the traveling size of the instrument is relatively small and conducive to storage within an airplane or bus passenger compartment. It can be seen by those skilled in the art that this particular configuration is adaptable to many different types of stringed musical instruments such as guitars, basses, violins, etc.

DETAILED DESCRIPTION OF THE INVENTION

Figure 1:
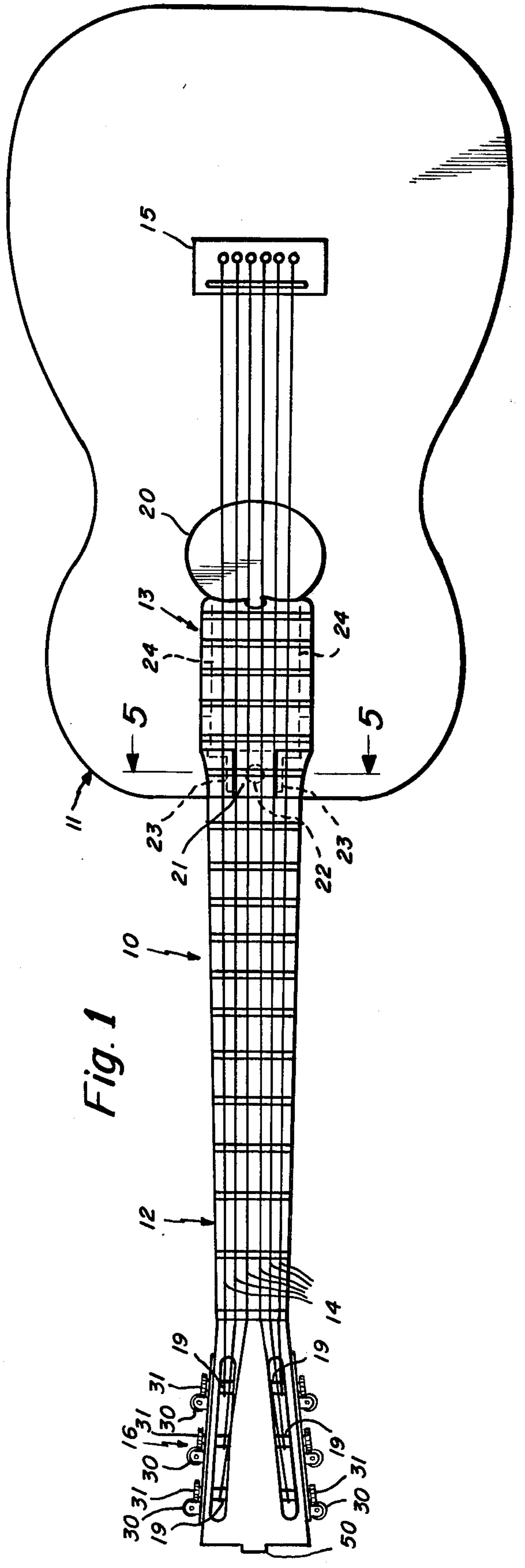
FIG. 1 is a top plan view of a preferred embodiment of the invention shown in its playing configuration.

In FIG. 1 is shown a preferred embodiment of the invention as it relates to a guitar 10. It can be seen by those skilled in the art that the present invention can be applied to several different stringed instruments. Guitar 10 has a sound box portion 11, neck portion 12 and finger board end portion 13. The strings 14 are positioned from a bridge saddle 15 along the upper surface of the sound box 11 and neck 12 to the peghead portion 16 of neck 12. As can be seen in detail below, the peghead portion 16 contains an arrangement of buttons 17 connected to tuner shafts 18 which adjust the tension on each string 14. As can be appreciated by those skilled in the art, a slotted type peghead is used to prevent the string 14 from unwinding from the tuner shafts 18 when not under tension. Between the bridge saddle 15 and fingerboard end 13 is located an oval sound hole 20. In addition to allowing the sound box 11 to breathe while vibrating from the action of playing, the oval shape provides additional clearance in conjunction with the open area left by the removed fingerboard end 13 for insertion of the peghead 16 and neck 12 for storage within the sound box 11.

Beneath the fingerboard end 13 shown in dotted line is the neck joint 21 formed in the shape of a tennon. Upper and lower holes 26 and 22 respectively are located at the top and bottom surfaces 28 and 20 respectively of neck joint 21. Undercuts 23 and 24, shown in greater detail below, provide the channels through which the underside of finger board end 13 is passed so as to secure fingerboard 13 to the sound box 11.

Figure 2:
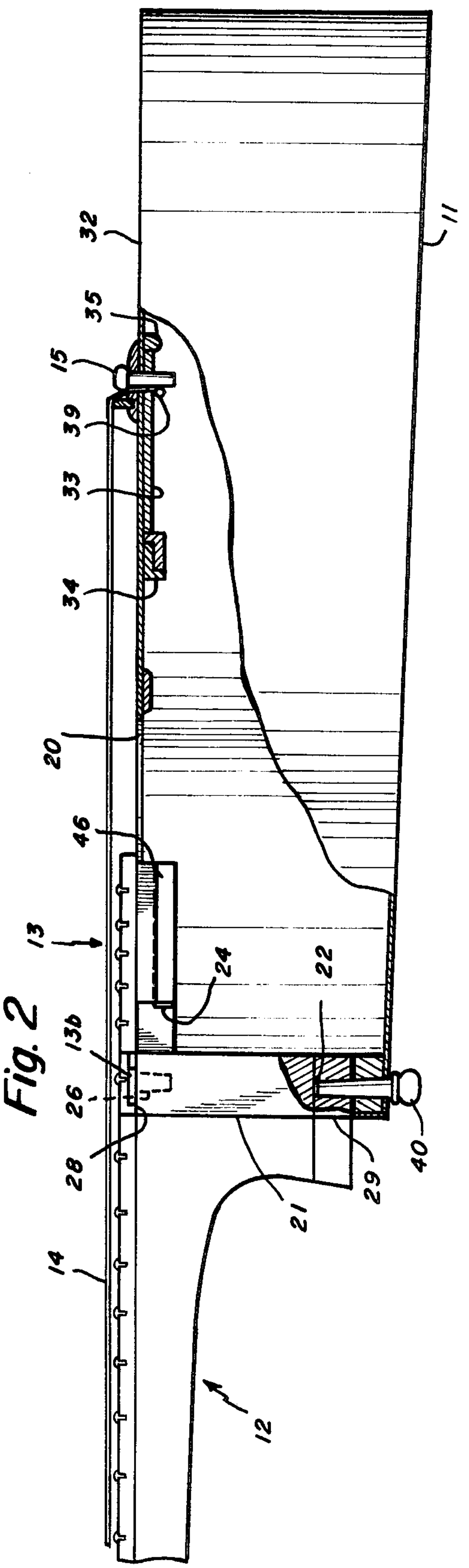
FIG. 2 is a side elevation, partially broken away, of a preferred embodiment of the invention shown in its playing configuration.

FIG. 2 shows in a side elevation partially broken away the guitar 10 in its open or playable position. The peghead section 16 of the neck 12 is shown to have the buttons 17 connected to tension shafts 18 which have worm gears 30 positioned at their distal ends. Contiguous with each worm gear 30 is a drive gear 31, which provides the necessary support for the worm gear 30 to be retained at a particular tension forming position. Beneath the upper surface 32 of sound box 11 is positioned a reinforcement plate 33. Reinforcement plate 33 is positioned between a lap joint of X braces 34 and a strut brace 35 so as to provide additional structural support for that particular portion of upper surface 32. Strut braces 36, 37 and 38 provide structural support for the sound box 11. Contiguous with the bridge saddle 15 and reinforcement plate 33 are the strings 14 which pass through each and terminate in a ball 39 beneath plate 33. Thus, it can be appreciated that the tension produced in strings 14 is caused by retention beneath plate 33 at one and and the connection to worm gear 30 at its other end. Further, the plate 33 provides the needed structural support to the upper surface 32 so that the bridge saddle 15 is not torn from the upper surface 32 when the tension on strings 14 is excessive.

The neck joint 21 is shown having tapered holes 26 and 22 at its upper and lower end respectively. In the playing position, the neck joint 21 is secured within the mortise of sound box 11 by insertion of a tapered pin 40 into hole 22. Fingerboard end 13, when slid into position as shown, covers the upper portion of neck joint 21. Runners 23 and 24 of fingerboard end 13 can be seen more clearly in FIGS. 4 and 5 below.

In the position shown in FIG. 2, the neck 12 is securely attached to the sound box 11 in such a manner that no stray or unwanted vibrations will occur in the instrument. The clarity of sound or tonal qualities produced by the stringed instrument shown in FIGS. 1 and 2 is not substantially different from the non-metamorphic variety. Yet, as is shown below, the instrument can be transformed into a traveling unit almost half its length.

Figures 3, 4, 5:
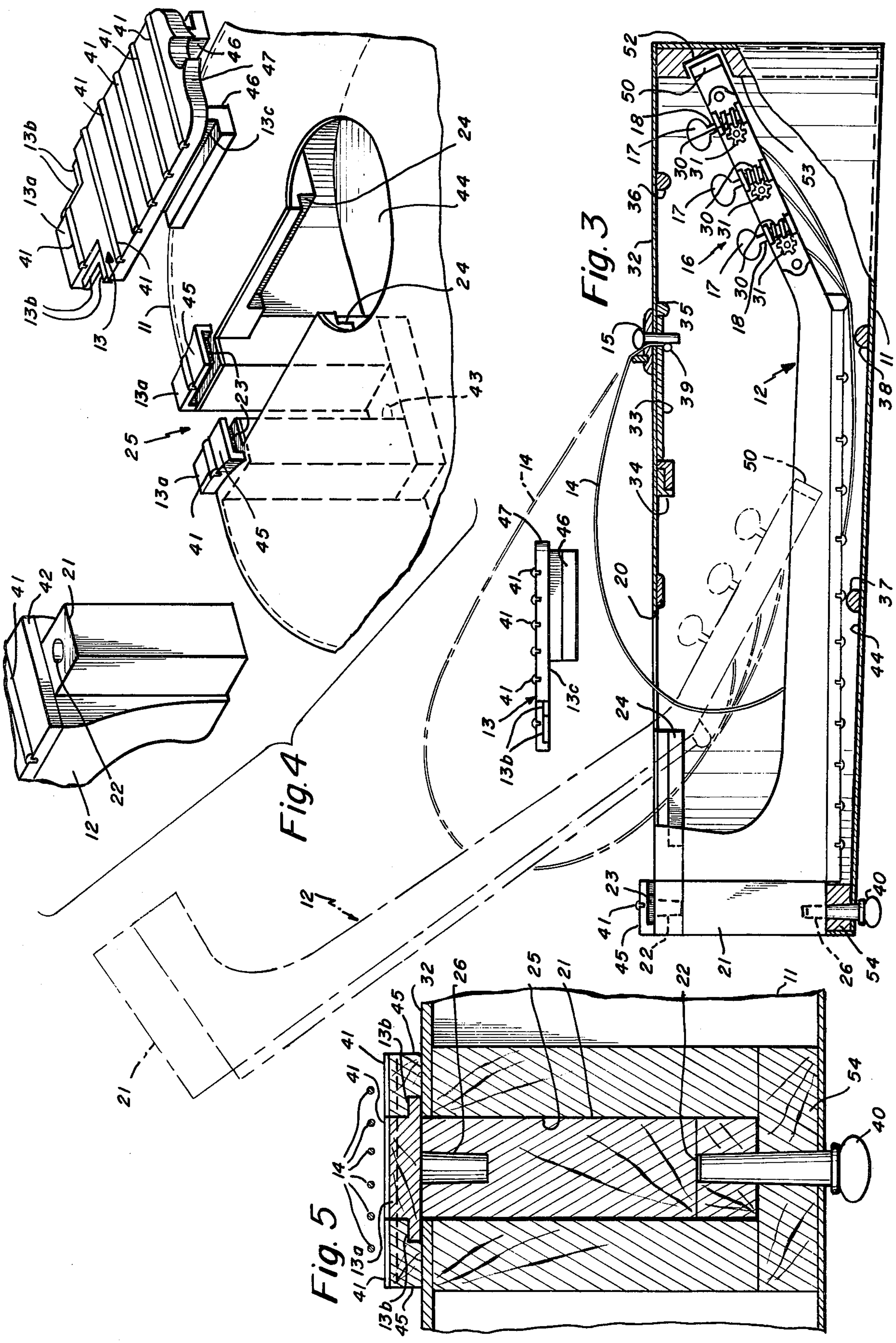
FIG. 3 is a side elevation, partially broken away, showing a preferred embodiment of the invention in its partially stored (phantom) and fully stored or non-playing position.
FIG. 4 is a perspective view of the invention in its detached position.
FIG. 5 is a section view of a preferred embodiment of the invention along line 5—5 of FIG. 1.

FIG. 4 shows in exploded perspective view the three main components of the invention in detachable form. The neck 12 and fingerboard end 13 have been removed from the sound box 11. For the purpose of clarity, the strings 14 and saddle bridge 15 have been deleted from this particular view.

Into the upper surface of neck 12 and fingerboard end 13 are inserted frets 41. At the junction between the neck 12 and sound box 11, a different fret 42 is configured from flat nickel silver wire or some suitable equivalent. These frets provide the desired changes in tone when the string is held between a particular set of frets. In essence, the strings 14 are caused to rest on the frets adjacent to the finger pressure point.

Along the bottom surface 44 of the sound box 11 in the mortise section 12 partially shown, is a hole 43 through which the tapered pin 40 is inserted. The fingerboard end 13 is shown having a tongue portion 13A with tab 13B extending along the sides of tongue 13A and the front of fingerboard 13. To receive this portion of fingerboard end 13 when in its closed position, ears 45 positioned along upper surface 32 on both sides of the mortise 25 have undercuts 23 which mate with tab 13B. Undercuts 24 are located along the lower portion of upper surface 32 and adapted to receive the runners 46 which are positioned along the bottom surface 13C of fingerboard end 13. Thus, the fingerboard end 13 is secured to sound box 11 along three sides with its back end 47 contiguous with the oval sound hole 20.

The stored position of neck 12 is shown in a partially cut away side elevation view in FIG. 3. Prior to moving the neck portion for removal, the tension on the strings should be reduced by merely adjusting the buttons 17. The neck 12 can be removed from the sound box 11 by withdrawal of the tapered pin 40. After the fingerboard end 13 is removed from its permanent position, the neck 12 is turned upside down and inserted (as shown in phantom), peghead 16 first, into the sound box 11. At the end of the peghead 16 section is a tennon 50 (refer to FIG. 1) which fits into a mortise 52 in tail block 53. The strings 14 are caused to flex into the sound box 11 as shown. After the neck 12 has been completely inserted into the sound box 11 through the opening defined by the sound hole 20 and removed fingerboard end 13, the neck joint 21 rests upon the base of the mortise in the head block 54. The upper hole 26 is now positioned contiguous with head block 54. Insertion of a tapered pin 40 secures the neck joint 21 to the sound box 11 in its stored position. The fingerboard end 13 then slides into position. In this configuration, the neck 12 is completely enclosed within the sound box 11. Further, the neck is secured at its peghead 16 end as well as at neck joint 21 end. Thus, as the sound box 11 is transported, the neck 12 is unable to cause damage to itself or to the sound box.

In FIG. 5, the combination of the sound box 11, neck 12 and fingerboard end 13 can be clearly seen. The tongue portion 13A of fingerboard end 13 fits above the neck joint 21. In addition to providing a supporting boundary to neck joint 21, tongue 13A insures that the neck joint 21 is properly seated since tongue 13A can not be completely inserted unless the neck joint 21 is in its proper position. Tabs 13B are shown beneath ears 45. The tapered pin 40 is shown within hole 22 so that the instrument is in its playing configuration.

I claim:

1. A collapsible stringed musical instrument comprising:

a sound box portion having an upper and lower confronting surface, said upper and lower surface being joined along their peripheral edges by a middle wall, said lower surface having a hole, said middle wall having an opening;

an elongated neck portion having a peg head portion at its outer end and a neck joint at its inner end, said neck joint having a non-connecting hole in its upper and lower surfaces so that said upper upper neck joint hole is aligned with said lower surface hole to form a continuous hole in a first neck storing position and said lower neck joint hole is aligned with said lower surface hole to form a continuous hole in a second neck storing position, said first neck storing position having said neck portion stored within said sound box portion and said second neck storing position having said neck portion positioned in a playing position;

a plurality of strings extending from said peghead portion to said sound box portion;

means for securing said neck portion to said sound box portion, said securing means being positioned within said lower surface hole and said upper neck joint hole in said first position, and said lower surface hole, and said lower neck joint hole in said second position;

a detachable portion of said upper surface of said sound box located between said middle wall opening and a portion of said upper surface having a bridge, said detachable position being removed from said upper surface during movement of said neck portion from said first neck storing position to said second neck storing position and vice versa.

2. A collapsible stringed musical instrument comprising:

a sound box portion having an upper and lower confronting surface, said upper and lower surfaces being joined along their peripheral edges by a middle wall, said lower surface having a hole, said middle wall having a mortise opening;

an elongated neck portion having a peg head portion at its outer end and a tennon at its inner end, said tennon having a non-connecting hole in its upper and lower surfaces so that said upper tennon hole is aligned with said lower surface hole to form a continuous hole in a first neck storing position and said lower tennon hole is aligned with said lower surface hole to form a continuous hole in a second neck storing position, said first neck storing position having said neck portion stored within said sound box portion and said second neck storing position having said neck portion positioned in a playing position;

a plurality of strings extending from said peghead portion to said sound box portion;

means for securing said neck portion to said sound box portion, said securing means being positioned within said lower surface hole and said upper tennon hole in said first position, and said lower surface hole and said lower tennon hole in said second position;

a detachable portion of said upper surface of said sound box located between said middle wall mortise opening and a portion of said upper surface having a bridge, said detachable portion being removed from said upper surface during movement of said neck portion from said first neck storing position to said second neck storing position and vice versa.

3. A collapsible stringed musical instrument in accordance with claim 1 or claim 2 wherein said securing means comprises a tapered lock pin.

4. A collapsible guitar comprising;

a sound box portion;

a neck portion having connecting means contiguous with said sound box portion, said sound box portion having means for receiving said connecting means in a first position and a second position, said first position having said neck portion stored within said sound box portion and said second position having said neck portion outside of said sound box portion;

a detachable fingerboard end being contiguous with said sound box portion so that said fingerboard end is removed when said neck portion is moved from said first position to said second position.

5. A collapsible guitar in accordance with claim 4 wherein said connecting means comprises a tennon located at one end of said neck portion, said tennon having a hole located at its upper and lower surfaces.

6. A collapsible guitar in accordance with claim 4 wherein said receiving means comprises a mortise opening in interengaging relationship with said tennon, and a hole in alignment with said tennon holes so that a securing pin is secured in said receiving means hole and said tennon holes to secure one to the other.

* * * * *